(12) United States Patent
Lindenfeld

(10) Patent No.: US 10,884,102 B2
(45) Date of Patent: Jan. 5, 2021

(54) PULSED RADAR SYSTEM USING OPTIMIZED TRANSMIT AND FILTER WAVEFORMS

(71) Applicant: Michael Joseph Lindenfeld, La Jolla, CA (US)

(72) Inventor: Michael Joseph Lindenfeld, La Jolla, CA (US)

( * ) Notice: Subject to any disclaimer, the term of this patent is extended or adjusted under 35 U.S.C. 154(b) by 60 days.

(21) Appl. No.: 16/172,560

(22) Filed: Oct. 26, 2018

(65) Prior Publication Data
US 2019/0227143 A1 Jul. 25, 2019

Related U.S. Application Data

(60) Provisional application No. 62/720,194, filed on Aug. 21, 2018, provisional application No. 62/619,733, filed on Jan. 20, 2018.

(51) Int. Cl.
| | |
|---|---|
| *G01S 7/282* | (2006.01) |
| *G01S 7/03* | (2006.01) |
| *G01S 13/58* | (2006.01) |
| *G01S 13/28* | (2006.01) |
| *G01S 7/292* | (2006.01) |

(52) U.S. Cl.
CPC ............. *G01S 7/282* (2013.01); *G01S 7/03* (2013.01); *G01S 7/292* (2013.01); *G01S 13/28* (2013.01); *G01S 13/288* (2013.01); *G01S 13/582* (2013.01)

(58) Field of Classification Search
CPC ........ G01S 7/282; G01S 13/288; G01S 7/292; G01S 13/28; G01S 13/582; G01S 7/03

USPC .......................................... 342/70, 202, 132
See application file for complete search history.

(56) References Cited

U.S. PATENT DOCUMENTS

| | | | | |
|---|---|---|---|---|
| 5,440,311 A | * | 8/1995 | Gallagher | G01S 13/284 342/132 |
| 6,067,043 A | * | 5/2000 | Faure | G01S 7/4052 342/135 |
| 6,184,820 B1 | * | 2/2001 | Kratzer | G01S 7/34 342/160 |

(Continued)

OTHER PUBLICATIONS

Ackroyd et al., "Optimum Mismatched Filters for Sidelobe Suppression," IEEE Transactions on Aerospace and Electronic Systems, 9(2):214-218, 1973.

(Continued)

*Primary Examiner* — Bo Fan
(74) *Attorney, Agent, or Firm* — Fish & Richardson P.C.

(57) ABSTRACT

The technology described in this document can be embodied in a radar system that employs pulse compression waveforms. In one aspect, a radar system includes a transmitter device and a receiver device, which are both configured to access a storage device. The storage device is configured to store a first sequence of values and a second sequence of values. The first sequence of values can represent phase values for a transmit waveform. The second sequence of values can represent complex values for a filter waveform. The first and second sequences of values are generated via a joint optimization process. An objective function of the first and second sequences is a weighted sum of metrics indicative of a sidelobe level of a simulated range response and frequency suppression of the transmit and filter waveforms outside and portions inside of a target bandwidth.

26 Claims, 8 Drawing Sheets

(56) References Cited

U.S. PATENT DOCUMENTS

| | | | | |
|---|---|---|---|---|
| 8,035,551 | B1* | 10/2011 | Govoni | G01S 7/292 |
| | | | | 342/189 |
| 2007/0046526 | A1* | 3/2007 | O' Hora | G01S 13/582 |
| | | | | 342/26 R |
| 2007/0160229 | A1* | 7/2007 | Bogdan | H04L 25/068 |
| | | | | 381/94.1 |
| 2014/0004865 | A1* | 1/2014 | Bhargava | H04W 40/12 |
| | | | | 455/445 |
| 2016/0041256 | A1* | 2/2016 | Schofield, III | G01S 13/931 |
| | | | | 342/70 |
| 2017/0269191 | A1* | 9/2017 | Yosoku | G01S 13/284 |

OTHER PUBLICATIONS

Baden et al., "Optimal Sidelobe Suppression for Biphase Codes," Proceedings of the National Telesystems Conference, 1991, 1:127-131.
Blinchikoff, "Range Sidelobe Reduction for the Quadriphase Codes," IEEE Transactions on Aerospace and Electronic Systems, 1996, 32(2):668-675.
Chan, "Sidelobes Reduction Using Simple Two and Tri-Stages Non Linear Frequency Modulation (NLFM)," Progress in Electromagnetics Research, Pier, 2009, 98:33-52.
Daniels et al., "Code Inverse Filtering for Complete Sidelobe Removal in Binary Phase Coded Pulse Compression Systems," Proceedings of the 2005 IEEE International Radar Conference, 2005, 7 pages.
Davis et al., "Phase Coded Waveforms for Radar", The MITRE Corporation, 2007, 21 pages.
De Witte et al., "Improved ultra-low range sidelobe pulse compression waveform design," Electronics Letters, 2004, 40:1448-1450.
Doerry, "Generating Nonlinear FM Chirp Waveforms for Radar," Sandia Report SAND2006-5856, 2006, 34 pages.
Fam et al., "Multiplicative Mismatched Filters for Optimum Range Sidelobe Suppression in Barker Code Reception," IEEE Transactions on Aerospace and Electronic Systems, 2008, 44(1):349-359.
Griffiths et al., "Design of low-sidelobe pulse compression waveforms," Electronics Letters, 1994, 30(12):1004-1005.
Griffiths, "Ultra-low range sidelobe pulse compression for satellite-borne rain radar," IEEE National Radar Conference, 1993, 28-33.
Guerci et al., "Theory and Application of Optimum Transmit-Receive Radar," IEEE, 2000, 705-710.
He et al., "Waveform Design with Stopband and Correlation Constraints for Cognitive Radar", Dept. of Electrical and Computer Engineering, 6 pages, 2010.
Jaber, "Sidelobe-Suppression Technique Applied to Binary Phase Barker Codes," Journal of Engineering and Development, 2012, 16(4):330-336.
Jakabosky et al., "Ultra-Low Sidelobe Waveform Design via Spectral Shaping and Linc Transmit Architecture," IEEE Radar Conference, 2015, 1021-1026.
Kerahroodi et al., "A Coordinate-Descent Framework to Design Low PSL/ISL Sequences," IEEE Transactions on Aerospace and Electronic Systems, 2017, 65(22):851-861.
Kiranmai, "Performance Evaluation of Compound Barker Codes using Cascaded Mismatched Filter Technique," International Journal of Computer Applications, 2015, 121(19):31-34.
Kurdzo et al., "A Pulse Compression Waveform for Improved-Sensitivity Weather Radar Observations," Journal of Atmospheric and Oceanic Technology, 2014, 31:2714-2731.
Levanon, "Cross-correlation of long binary signals with longer mismatched filters," IEE Proceedings of Radar, Sonar, and Navigation, 2005, 152(6):377-382.
Lindenfeld, "Sparse frequency transmit-and-receive waveform design," IEEE Transactions on Aerospace and Electronic Systems, 2004, 40(3):851-861.
Liu et al., "Joint Optimization of Transmit and Receive Beamforming in Active Arrays," IEEE Signal Processing Letters, 2014, 21(1):39-42.
Nunn et al., "Constrained Optimization Applied to Pulse Compression Compression Codes, and Filters," IEEE, 2005, 5 pages.
Nunn et al., "Performance of Pulse Compression Code and Filter Pairs Optimized For Loss and Integrated Sidelobe Level," IEEE, 2007, 110-115.
Rihaczek et al., "Range Sidelobe Suppression for Barker Codes," IEEE Transactions on Aerospace and Electronic Systems, 1971, 7(6)1087-1092.
Soltanalian et al., "Joint Design of the Receive Filter and Transmit Sequence for Active Sensing," IEEE Signal Processing Letters, 2013, 20(5):423-426.
Song, "Optimization Methods for Designing Sequences With Low Autocorrelation Sidelobes," IEEE Transactions on Aerospace and Electronic Systems, 2015, 63(15):3998-4009.
Stoica et al., "New Algorithms for Designing Unimodular Sequences With Good Correlation Properties", IEEE Transactions of Signal Processing, 57(4): 1415-1425, 2009.
Stoica et al., "Optimization of the Receive Filter and Transmit Sequence for Active Sensing," IEEE Transactions on Singal Processing, 2012, 60(4):1730-1740.
Stoica et al., "Transmit Codes and Receive Filters for Radar," IEEE Signal Processing Magazine, 2008, 94-109.
Tanner et al., "Pulse Compression with Very Low Sidelobes in an Airborne Rain Mapping Radar," IEEE Transactions on Geoscience and Remote Sensing, 1994, 32(1):1-9.
Xu et al., "Joint Design of Phase Coded Waveform and Mismatched Filter," IEEE Radar Conference, 2015, 32-36.
Zhao et al., "Maximin Joint Optimization of Transmitting Code and Receiving Filter in Radar and Communications," IEEE Transactions on Signal Processing, 2017, 65(4):850-863.
Zhao et al., "Pcfm Radar Waveform Design with Spectral and Correlation Considerations," IEEE, 2016, 1-24.
Zhao et al., "Adaptive gradient search for optimal sidelobe design of hopped-frequency waveform," IET Radar, Sonar and Navigation, 2014, 8(4):282-289.
Zhao, "Over-sampled polyphase code design for physical implementation with spectral and correlation consideration," IEEE Radar Conference, 2016, 7 pages.

* cited by examiner

PULSED RADAR SYSTEM USING OPTIMIZED TRANSMIT AND FILTER WAVEFORMS

PRIORITY CLAIM

This application claims priority to U.S. Provisional Application 62/619,733, filed on Jan. 20, 2018, and U.S. Provisional Application 62/720,194, filed on Aug. 21, 2018. The contents of each of the above applications are incorporated herein by reference.

TECHNICAL FIELD

This disclosure generally relates to pulsed radar systems that utilize pulse compression using transmit and filter waveforms.

BACKGROUND

Pulsed radar waveforms are designed to increase resolution and reduce sidelobes. Using identical transmit and filter waveforms (the matched case) is known to maximize SNR for a single target and white noise. However, for other environments and applications, such as clutter-dominated environments, multiple target environments, separation of targets from their multipath reflection, and target identification for High Range Resolution (HRR) radars, mismatched transmit and filter waveforms may be designed to produce optimal results according to at least four performance figures of merit (FOM).

These four FOMs are 1) sidelobe power minimization, 2) constrained SNR loss, 3) spectral containment of both the transmit and filter waveforms, and 4) Doppler tolerance for moving targets, platforms, or both. Poor performance in just one of these FOMs can result in a waveform unsuitable for a given application.

While some conventional systems, apparatuses, and methods may address subsets of these FOMs, adequate performance for all four is necessary for a high performance radar system. Thus, there is a need for systems, apparatuses, and methods for simultaneously optimizing transmit and filter waveforms with respect to all four FOMs.

SUMMARY

This document describes technology referred to as Mismatched Oversampled Waveforms (MOW), in which pulsed radar systems employ pulse compression using oversampled mismatched transmit and filter waveforms that are simultaneously optimized for complex, real-world environments. A computing device-implemented method is described in which the oversampled mismatched transmit and filter waveforms are simultaneously optimized so that 1) the cross-correlation of the two waveforms produces a range response with reduced sidelobe power, 2) SNR loss is constrained to an acceptable level, 3) spectral leakage is contained for both the transmit and filter waveforms, and 4) performance is robust to a broad range of Doppler frequencies.

In one aspect, a computing device-implemented method includes receiving one or more input parameters that include a first parameter indicative of a number of code samples of a first waveform; a second parameter indicative of a number of code samples of a second waveform, in which the number of code samples of the second waveform is greater than the number of code samples of the first waveform; and a third parameter indicative of an oversampling ratio. The method further includes generating, by one or more processing devices executing a joint optimization process, (i) a first sequence of values representing phase values for the first waveform, and (ii) a second sequence of values representing a set of complex amplitude values for the second waveform. The first and second sequences of values are generated such that an objective function of the first sequence and the second sequence satisfies a set of one or more conditions, subject to one or more constraints. The objective function includes a weighted sum of a Doppler tolerant metric indicative of a sidelobe level of a simulated range response, a metric indicative of a frequency suppression of the first waveform inside and/or outside of a target bandwidth, and a metric indicative of a frequency suppression of the second waveform inside and/or outside of the target bandwidth. The method further includes storing the first sequence of values and the second sequence of values in a storage device accessible to a transmitter device and a receiver device such that a measured range response to a transmit waveform transmitted by the transmitter device based on the first sequence of values is computed by the receiver device as a cross-correlation between (i) a sequence of values representing a received signal, and (ii) the second sequence of values.

In another aspect, a radar system includes a transmitter device configured to transmit a transmit signal encoding a transmit waveform having a plurality of pulses, and a receiver device configured to receive a received signal. The transmitter device and the receiver device are further configured to access a storage device configured to store a first sequence of values and a second sequence of values such that a measured range response to the transmit signal transmitted by the transmitter device based on the first sequence of values is computed by the receiver device as a cross-correlation between (i) a sequence of values representing the received signal, and (ii) the second sequence of values. The first sequence of values and the second sequence of values are generated by a computing device configured to execute instructions to perform operations including receiving one or more input parameters that include a first parameter indicative of a number of code samples of a first waveform; a second parameter indicative of a number of code samples of a second waveform, in which the number of code samples of the second waveform is greater than the number of code samples of the first waveform; and a third parameter indicative of an oversampling ratio. The operations further include generating, by one or more processing devices executing a joint optimization process, (i) the first sequence of values representing phase values for the first waveform, and (ii) the second sequence of values representing a set of complex amplitude values for the second waveform. The first and second sequences of values are generated such that an objective function of the first sequence and the second sequence satisfies a set of one or more conditions, subject to one or more constraints. The objective function includes a weighted sum of a Doppler tolerant metric indicative of a sidelobe level of a simulated range response, a metric indicative of a frequency suppression of the first waveform inside and/or outside of a target bandwidth, and a metric indicative of a frequency suppression of the second waveform inside and/or outside of the target bandwidth.

In another aspect, a system includes a computing device that includes a memory configured to store instructions and a processor to execute the instructions to perform operations. The operations include receiving one or more input parameters that include a first parameter indicative of a number of code samples of a first waveform; a second parameter indicative of a number of code samples of a second waveform, in which the number of code samples of the second waveform is greater than the number of code samples of the first waveform; and a third parameter indicative of an oversampling ratio. The operations further include generating, by one or more processing devices executing a joint optimization process, (i) a first sequence of values representing phase values for the first waveform, and (ii) a second sequence of values representing a set of complex amplitude values for the second waveform. The first and second sequences of values are generated such that an objective function of the first sequence and the second sequence satisfies a set of one or more conditions, subject to one or more constraints. The objective function includes a weighted sum of a Doppler tolerant metric indicative of a sidelobe level of a simulated range response, a metric indicative of a frequency suppression of the first waveform inside and/or outside of a target bandwidth, and a metric indicative of a frequency suppression of the second waveform inside and/or outside of the target bandwidth. The operations further includes storing the first sequence of values and the second sequence of values in a storage device accessible to a transmitter device and a receiver device such that a measured range response to a transmit waveform transmitted by the transmitter device based on the first sequence of values is computed by the receiver device as a cross-correlation between (i) a sequence of values representing a received signal, and (ii) the second sequence of values.

In another aspect, one or more computer readable media store instructions that are executable by a processing device, and upon such execution cause the processing device to perform operations. The operations include receiving one or more input parameters that include a first parameter indicative of a number of code samples of a first waveform; a second parameter indicative of a number of code samples of a second waveform, in which the number of code samples of the second waveform is greater than the number of code samples of the first waveform; and a third parameter indicative of an oversampling ratio. The operations further include generating, by one or more processing devices executing a joint optimization process, (i) a first sequence of values representing phase values for the first waveform, and (ii) a second sequence of values representing a set of complex amplitude values for the second waveform. The first and second sequences of values are generated such that an objective function of the first sequence and the second sequence satisfies a set of one or more conditions, subject to one or more constraints. The objective function includes a weighted sum of a Doppler tolerant metric indicative of a sidelobe level of a simulated range response, a metric indicative of a frequency suppression of the first waveform inside and/or outside of a target bandwidth, and a metric indicative of a frequency suppression of the second waveform inside and/or outside of the target bandwidth. The operations further includes storing the first sequence of values and the second sequence of values in a storage device accessible to a transmitter device and a receiver device such that a measured range response to a transmit waveform transmitted by the transmitter device based on the first sequence of values is computed by the receiver device as a cross-correlation between (i) a sequence of values representing a received signal, and (ii) the second sequence of values.

Implementations may include one or more of the following features. The one or more input parameters may be received based on a set of target characteristics for the simulated range response. The set of target characteristics for the simulated range response may include at least one of a target value for the metric indicative of the sidelobe level of the simulated range response, a target value for a metric indicative of an overall frequency suppression of the simulated range response, and a target value for a metric indicative of a Doppler tolerance. The metric indicative of the sidelobe level of the simulated range response may include terms that represent at least one of an integrated sidelobe level, a peak sidelobe level, an average sidelobe level, and a median sidelobe level. The one or more input parameters may include a sample rate supported by the transmitter device and the receiver device, and may include a target value for a metric indicative of an overall frequency suppression of the range response. The one or more constraints may include an acceptable SNR loss threshold; a constraint imposed on a mainlobe associated with the simulated range response, which may specify that the mainlobe has a magnitude substantially equal to unity; and/or a first phase of the first sequence of values constrained to 0. In some implementations, generating the first sequence of values and the second sequence of values may include initializing a first set of decision variables as a series of phases within a range; initializing a second set of decision variables as a series of complex values; and generating the first and second sequence of values from the first and second set of decision variables, respectively, by executing the joint optimization process on the first and second set of decision variables, the joint optimization process being constrained by the one or more constraints. The series of phases can be a series of random numbers within a $2\pi$ range. At least one sidelobe of the simulated range response may be excluded from a computation of the objective function, and in some cases, the at least one excluded sidelobe is directly adjacent to a mainlobe associated with the simulated range response. Generating the first and second sequence of values may include generating multiple candidate sets of values, each candidate set comprising a candidate first sequence of values and a candidate second sequence of values; computing, for each candidate set, a value of the objective function; determining that a value of the objective function for a particular candidate set is less than values of corresponding objective functions of other candidate sets; and responsive to determining that the value of the objective function computed for the particular candidate set is less than the values of corresponding objective functions of the other candidate sets, selecting the first and second candidate sequence of values corresponding to the particular candidate set as the first and second sequence of values, respectively. The one or more conditions can include a condition that a value of the objective function is locally minimized. The oversampling ratio can be a function of the target bandwidth and a sample rate. The first set of suppressed frequencies used to calculate the metric indicative of a frequency suppression of the first waveform inside and/or outside of the target bandwidth can be the same as or different from a second set of suppressed frequencies used to calculate the metric of a frequency suppression of the second waveform inside and/or outside of the target bandwidth. The first set of suppressed frequencies and/or the second set of frequencies can include frequencies that fall within the target bandwidth. The first set of suppressed frequencies can be selected to restrict emission to frequency bands that require limited levels of emission. The second set of suppressed frequencies can be selected to filter out frequency bands in which a strong emitter is emitting. The target bandwidth can be determined based on the oversampling ratio and a chip duration. The amplitudes of the transmit waveform can be ramped up at a start of the transmit waveform and amplitudes of the transmit waveform can be ramped down at an end of the transmit waveform. The Doppler tolerant metric indicative of a sidelobe level can be a sum of a time ambiguity function over a set of Doppler frequencies. For the radar system, the receiver device may be further configured to generate an output indicative of a location of an object as calculated by multi-range processing around the peak range response.

DETAILED DESCRIPTION

Figure 1:
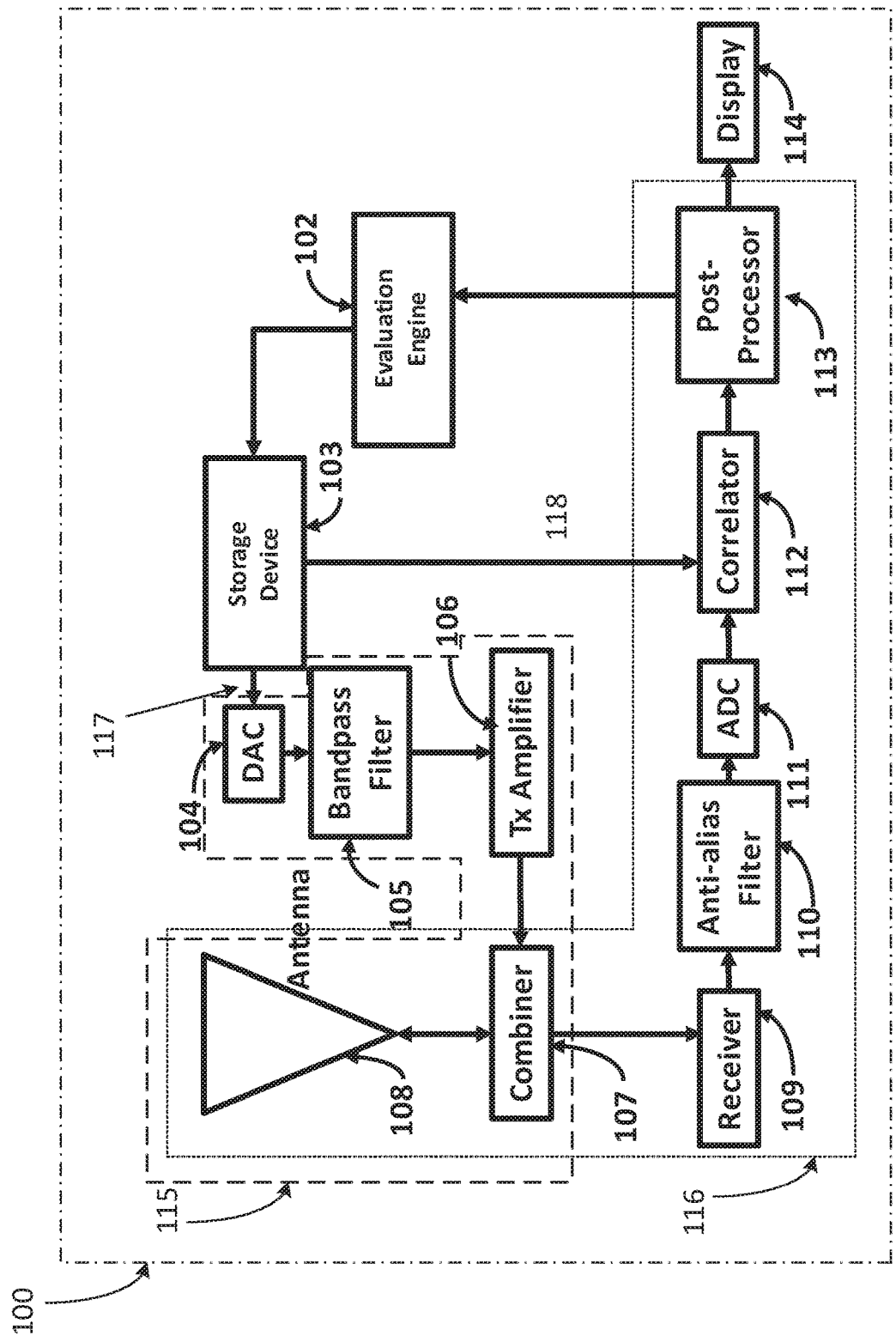
FIG. 1 is a block diagram illustrating an exemplary pulsed radar system incorporating mismatched oversampled waveforms (MOW) transmit and filter codes.

Radar systems utilize radio waves for object detection, and can be configured to determine one or more of the range, angle, and velocity of objects. In some cases, this information can be calculated by multi-range processing around a peak range response of the radar system, processing several range samples for a range estimate. To accomplish object detection, radar systems can transmit pulses with a phase only waveform, as power amplifiers are most efficient and distort less with this mode. This maximizes radiated energy for a given pulse width for a saturation mode amplifier. To achieve adequate energy on a small radar cross-section (RCS) target, the pulse width may be long, which can significantly reduce range resolution. Alternatively, pulse compression using waveforms can achieve much better resolution for the same pulse width and power. The pulse time dependence is a series of short sub-pulses or chips, each depending on a complex number. Together, these numbers form a code indicative of a waveform.

Conventional pulsed radar systems often use identical transmit and filter waveforms (known as the matched case), which maximizes SNR in environments with a single target and white noise. However, in complex environments, it may be more advantageous to use non-identical, or mismatched, transmit and filter waveforms. At least four FOMs relate to the performance of a radar system that utilizes mismatched transmit and filter waveforms.

The first two FOMs are sidelobe power minimization and constrained SNR loss. Sidelobe power of a range response may be measured by metrics including, but not limited to, the sum of power in all sidelobes known as Integrated Sidelobe Level (ISL), and the largest sidelobe power known as Peak Sidelobe Level (PSL). SNR loss in the mismatched case is measured relative to that of the matched case.

In the matched case, the range response is an auto-correlation of the transmit waveform and always results in symmetric outputs. For matched constant modulus waveforms of an amplifier operating in a saturated mode, Linear Frequency Modulation (LFM) chirps have been employed, with improvements including sections of different chirp rates, hopped frequency bursts, more general nonlinear FM, and sinusoidally tapered amplitudes at the first and last thirds of the waveform. Adaptive chirps can be derived to reduce SNR loss. These chirp modifications often broaden the mainlobe.

Barker codes are unit modulus binary phase codes with low autocorrelation sidelobes. Longer binary codes and other codes with a small finite number of phases also have low autocorrelation sidelobes. Polyphase waveforms have continuous phases at each sample. An efficient least squares algorithm for matched polyphase codes to minimize ISL based on Fast Fourier Transforms (FFT) is known as Cyclic Algorithm New, or CAN (see, for example, Stoica, He, and Li, 2009; He, Li, and Stoica, 2012; Song, 2015), and its ISL is an improvement over that of chirps and finite phase codes. Additionally, the noise-like waveforms are Low Probability of Intercept (LPI).

Still lower sidelobes are obtained for the mismatched case, where the unit modulus transmit waveform is specified and a complex filter waveform of more samples and arbitrary amplitude is calculated. In the mismatched case, range response is the cross-correlation of the transmit and filter waveforms. Consequently, mismatched codes can have asymmetric weights with resulting asymmetric range and spectral response.

Since it is believed that the specified transmit waveform should have a sharply peaked auto-correlation function, binary waveforms such as Barker codes, or other binary codes with good correlation properties found by computer searches, have been adopted as input to derive filter codes. This calculation can also be extended to multiple transmit waveforms and chirp transmit waveforms.

In each of these examples, the transmit code is specified based on its auto-correlation and not based on its suitability with the filter waveform for producing a range response with desired properties. One approach for reducing ISL is simultaneous calculation of phase only transmit codes and mismatched receive filters. These algorithms have an equality constraint for the mainlobe and an inequality constraint that sets a ceiling to SNR loss. While these algorithms jointly optimize the transmit and filter waveforms with respect to sidelobe level and SNR loss, they ignore the FOMs of spectral containment and Doppler tolerance. The present technique improves upon these algorithms by further optimizing for both spectral containment and Doppler tolerance.

The third FOM is spectral containment. Converting from a discrete code to continuous time dependence causes spectral spreading. Chip time duration can be defined as the inverse bandwidth. If the transmit code discontinuously jumps phases between chips, the resulting time waveform spreads frequency sidelobes outside the allowed bandwidth into other bands that should not be radiated into, such as those for navigation. Since the receive filter is also not band limited, external sources transmitting bands in nearby frequencies will be processed and increase noise.

Transmit spectral sidelobes can be reduced somewhat by a modulation which has no discontinuous phase jumps and generates a continuous intra-pulse time dependence between code samples. This includes Differential Phase Shift Keying (DPSK) and Minimum Shift Keying (MSK) for binary codes and Continuous Phase Modulation (CPM) for polyphase codes. CPM has discontinuous first derivatives at chip boundaries and for some versions, amplitude variability. These modulation algorithms suppress spectral leakage, but have no explicit frequency penalty. Without this, out-of-band spectral reduction may not satisfy transmission requirements and straddling loss is high. Also, sidelobe minimization is not optimal, as the deterministic oversampled time samples are not optimized for sidelobe reduction. In the present MOW process, these challenges are overcome, with all samples contributing to both sidelobe reduction and spectral containment, and an explicit frequency penalty being provided.

Previous techniques oversample each chip by a factor of 2 and solve for a matched filter that minimizes a weighted sum of ISL and a penalty for out-of-band spectral power. The effective low-pass of phase samples followed by CPM produces lowered spectral energy. In another application, a time waveform is generated from discrete codes by sinc interpolation to reduce spectral leakage, but the resulting waveform is not unit modulus. Additional samples from CPM smooth code phase jumps and are not designed to reduce ISL. The present technique oversamples at a much larger factor (nominally 8), the transmit waveform is almost entirely unit modulus, and all samples work to reduce ISL and improve spectral containment, so that a usable emitted waveform is obtained just by a Digital to Analog Converter (DAC) and an analog low-pass filter, and CPM is not needed.

The fourth FOM is Doppler tolerance, which can be important for polyphase codes, as even a small phase ramp over the uncompressed pulse width affects performance, especially for broad band, long pulse codes. Traditionally, a bank of Doppler corrected receive filters has been proposed but many banks would be required as the Doppler extent for acceptable loss is small. The MOW process addresses this issue by extending an ISL related functional to sum over an input range of Doppler frequencies to broaden the range of acceptable Doppler frequencies.

Unlike the previously mentioned conventional systems and techniques, the MOW process utilizes a joint optimization of oversampled, mismatched transmit and filter waveforms to improve radar performance with respect to 1) sidelobe power level, 2) SNR loss, 3) spectral containment, and 4) Doppler tolerance. Further details of the present technique, its variations, and its advantages are described herein.

FIG. 1 shows an exemplary monostatic pulsed radar system 100 employing pulse compression waveform codes provided by a storage device 103 (as graphically represented by lines 117 and 118). The radar system can include a transceiver consisting of a transmitting system 115 and a receiving system 116. The transmitting system 115 accepts as input a transmit code from the storage device 103 (as represented by line 117). The transmit code is converted to a time waveform by the Digital to Analog Converter (DAC) 104, low-pass filtered in block 105, modulated to RF and amplified in 106, sent through the combiner 107 and provided to the antenna 108. The combiner 107 has a T/R switch allowing it to switch between transmit and receive modes. The receiving system 116 receives returns via the antenna 108 and the combiner 107, and the returns are demodulated in the receiver 109. The demodulated returns are then passed through an anti-alias filter 110, digitized in the Analog to Digital Converter (ADC) 111 and correlated (in Correlator 112) with the filter code (provided by the storage device 103, as represented by line 118), sometimes referred to as a receive waveform or receive filter code. The post-processor 113 does Doppler processing, jammer cancellation, track formation, and other multi-pulse procedures. In some cases, this output can guide waveform choice and can be presented on a display 114 of the radar system 100.

The radar system 100 may include an evaluation engine 102 that is configured to evaluate completion of a radar mission. The output of the evaluation engine 102 can be based in part from the output of the receiving system as well as input from an external radar operator. While the evaluation engine is shown as a part of the radar system 100, in some cases, the external radar operator can provide or assist the functionality of the evaluation engine 102. Transmit and receive waveform code pairs are stored in the storage device 103, and based on an output of the evaluation engine 102, a pair of waveforms consisting of a transmit waveform code 117 and a filter code 118 is selected. For example, if an extended target is detected, a High Range Resolution (HRR) waveform pair can be selected. The pairs of transmit and filter codes stored in the storage device 103 can be determined using one or more techniques described herein.

Figure 2:
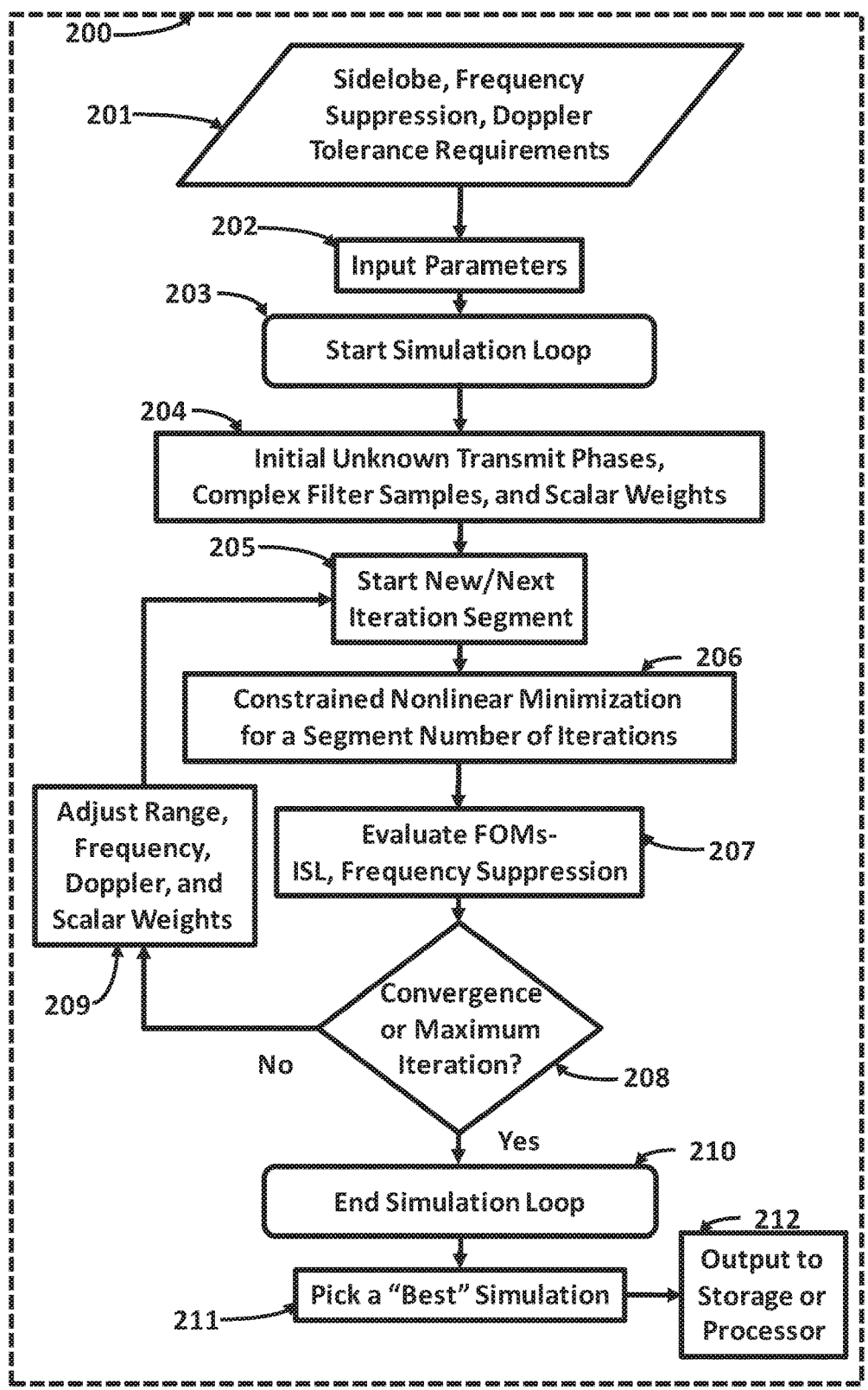
FIG. 2 is a flow chart of operations for determining an optimized transmit and filter code.

FIG. 2 shows a flow chart 200 for simultaneously determining a pair of optimized transmit and filter waveform codes that may be stored in a storage device 103 of the radar system 100. In general, the technique represented in flowchart 200 optimizes transmit and filter codes by constrained minimization of a weighted sum of multiple non-linear scalar functions, also referred to as the objective function. These functions involve a generalized ISL and spectral content and are explained in detail below. While a constrained minimization of the objective function is described, in some cases, the objective function may have a form in which a constrained maximization is performed.

The flowchart 200 first assigns sidelobe, frequency suppression, and Doppler tolerance requirements 201 and infers input parameters 202, which can include a number of samples, parameters defining process variations that are shown later, and if the system allows it, a sample rate. Unknown decision variables in the minimization routine are transmit phases and filter code samples, with decision variables defined as quantities subject to change in order to perform the constrained optimization of the objective function.

Once the input parameters are inferred, the simulation loop starts 203. Initial values are assigned 204, the minimization routine starts 205, and a constrained nonlinear minimization routine is performed 206. For the purposes of this application, each minimization routine that uses a given set of range, frequency, Doppler, and scalar weights is referred to as a segment. After an input number of iterations for a particular segment, the then current solution is used to evaluate the FOMs, ISL, and frequency suppression 207. If the value of the objective function has converged or if a maximum number of iterations has been reached in 208, the simulation loop is ended 210. If neither the objective function has converged nor the maximum number of iterations has been reached, the weights are adjusted 209 and the next segment of iterations is performed 205.

In some cases, segment loops are terminated if the sidelobe, frequency suppression, and Doppler tolerance requirements are satisfied, if convergence is obtained, or if a maximum number of iterations is reached. The simulation can be rerun a number of times with different initial values to increase the probability that one of the simulations is close to the global minimum. The best solution is chosen 211, and codes are output to storage or directly to the transmitter and receiver 212. In some cases, the best solution is selected based on a set of transmit phases and filter code samples that generate the lowest value of the objective function. While the flowchart 200 represents operations to perform a minimization routine, it is understood that in some cases, a maximization routine may be implemented.

Implementation of the MOW process is herein described incrementally with respect to the four FOMs of sidelobe reduction, constrained SNR loss, spectral containment, and Doppler tolerance. First, sidelobe minimization with constrained SNR loss is described for simultaneously optimizing a phase-only transmit and mismatched receive codes. Then, to avoid spectral leakage, an oversampled version is shown, with low pass filtering via frequency band suppression and amplitude ramping of the transmit waveform. Finally, Doppler tolerance is included.

As described above, a phase-only transmit code and a mismatched complex receive filter code of more samples are found simultaneously while minimizing sidelobe power subject to a constrained SNR loss relative to that of a matched filter. This description is for a single channel antenna and unknown target and clutter spectral and amplitude content, but can be generalized to include Multiple Input Multiple Output (MIMO) radar systems and spectral adaptation.

Correlations are defined for codes of unequal length. Transmit and filter codes are of length $N_t$ and $N_r$, respectively, with $N_r > N_t$. Both $N_t$ and $N_r$ are odd so that symmetric codes and range response can be generated. While symmetric codes are preferred because they halve the number of unknown decision variables, in some cases, asymmetric codes and range responses can be generated. The transmit code is defined as $$x(n) = b(n) \exp[i\phi(n)], n = 1, \ldots, N_t \quad (1)$$

where the $N_t$ samples have unknown phases $\varphi(n)$ between $-\pi$ and $\pi$ radians and $b(n)$ is a known real amplitude used later for ramping up and down amplitudes of the transmit waveform. For now, all amplitudes are unity, so the transmit code is unit modulus. The corresponding arbitrary complex filter code of $N_r$ samples is $y(n)$, $n=1, \ldots, N_r$. The sets of transmit and filter code samples are combined into vectors x and y, respectively. When calculating cross-correlations for $N_r - N_t \geq 2$, the transmit code is symmetrically zero-padded to be the same length as the receive code such that $$\bar{x}(n) = \begin{cases} 0, n = 1, \ldots, (N_r - N_t)/2 \\ x(n - (N_r - N_t)/2), n = (N_r - N_t)/2 + 1, \ldots, (N_r + N_t)/2 \\ 0, n = (N_r + N_t)/2 + 1, \ldots, N_r \end{cases} \quad (2)$$

Range response is the cross-correlation where only the $N_t + N_r - 1$ non-zero range samples are retained, $$r(k) = \begin{cases} \sum_{n=k+1}^{N_r} \bar{x}(n) y^*(n-k), k = 0, \ldots, N-1 \\ \sum_{n=1}^{N_r+k} \bar{x}(n) y^*(n-k), k = -N+1, \ldots, -1 \end{cases}$$

$$= \sum_{n=\max(1,k+1)}^{\min(N_r+k,N_r)} \bar{x}(n) y^*(n-k), k = -N+1, \ldots, N-1, \quad (3)$$

$$N = (N_t + N_r)/2.$$

The central mainlobe peak is at k=0.

The mainlobe equality constraint is a mainlobe response of unity, or, $$r(0) = \sum_{n=1}^{N_r} \bar{x}(n) y^*(n) = 1. \quad (4)$$

The nonlinear inequality constraint restricts SNR Loss to be less than an acceptable number, $\beta$, usually around 3 dB.

$$\text{SNR Loss} = \sum_{n=1}^{N_t} b(n)^2 \sum_{n=1}^{N_r} |y(n)|^2 \leq \beta. \quad (5)$$

Initial values are random transmit waveform phases between $-\pi$ and $\pi$ radians and Gaussian complex receive waveform samples. The mainlobe constraint of (4) can be satisfied for the initial iteration by rescaling the receive waveform by $$y_0 \to \frac{y_0}{r_0(0)^*}, \quad (6)$$

where $x_0$ and $y_0$ are the initial code vectors and $r_0(0)$ is the mainlobe value calculated with these codes in (4).

The sidelobe penalty function is a generalized Integrated Sidelobe Level (ISL), $$J_{SL} = \left[\sum_{k=-N+1}^{-1} + \sum_{1}^{N-1}\right] w(k) |r(k)|^2. \quad (7)$$

Flexibility in setting range weights allows, in example variations of the MOW process, suppressing certain high-clutter power ranges asymmetrically, ignoring ranges with no possible clutter, expanding the mainlobe, and emphasizing sidelobes adjacent to the mainlobe for HRR. The standard ISL is for all w(k)=1, equally summing all sidelobe power except for the mainlobe. For matched filters, the ISL function can be written in terms of Fourier transforms of the code, and iterations typically update this transform. For mismatched codes, the transmit function is zero-padded before a Fourier transform, and (7) is typically evaluated in sample space to maintain the zero-padded properties of the transmit function, but can optionally be evaluated in other domains.

In some implementations, the process for minimization of a nonlinear multi-variable real scalar function with nonlinear constraints can use the fmincon function available in MATLAB®. The penalty function and constraints are invariant to a constant phase shift over all transmit and filter samples. Therefore the first transmit phase is assigned the value zero and is not part of the unknowns. The fmincon function uses only real variables and function values, so a combined unknown vector of length $N_t + 2N_r - 1$, is solved for, $$z = \begin{pmatrix} \tilde{\phi} \\ \text{Re}(y) \\ \text{Im}(y) \end{pmatrix}, \tilde{\phi}(n) = \phi(n+1), n = 1, \ldots, N_t - 1. \qquad (8)$$

The two non-linear equality constraints are $$\text{Re}[r(0)]=1, \text{Im}[r(0)]=0, \qquad (9)$$

and the single inequality constraint is (5).

For the matched case, an auto-correlation of the transmit code has the symmetry $r(k)=r^*(-k)$, but this is not true in general for cross-correlations of the transmit and filter codes in the mismatched case. Even symmetric range weights produce asymmetric cross-correlations due to initial condition randomness. Symmetric range sidelobes $r(k)=r(-k)$ result from symmetric codes. In this case, truncated first half codes $x_s$ and $y_s$ are of lengths $N_{tc}=(N_t+1)/2$ and $N_{rc}=(N_r+1)/2$, respectively. Symmetrization is around the central sample, or, $$\phi(n) = \begin{cases} \phi_s(n), n = 1, \ldots, N_{tc} \\ \phi_s(N_t - n + 1), n = N_{tc} + 1, \ldots, N_t \end{cases}, \qquad (10)$$

$$y(n) = \begin{cases} y_s(n), n = 1, \ldots, N_{rc} \\ y_s(N_r - n + 1), n = N_{rc} + 1, \ldots, N_r \end{cases}.$$

Thus, the unknown vector of length $N_{tc}+2N_{rc}-1$ for symmetric waveforms is $$z_s = \begin{pmatrix} \tilde{\phi}_s \\ \text{Re}(y_s) \\ \text{Im}(y_s) \end{pmatrix}, \tilde{\phi}_s(n) = \phi_s(n+1), n = 1, \ldots, N_{tc} - 1. \qquad (11)$$

Symmetric waveforms are used for the basic process as they have about half the number of unknowns and therefore the search calculation converges more rapidly. While symmetric codes are preferred, in some cases, asymmetric codes and range responses can be generated.

Figure 3:
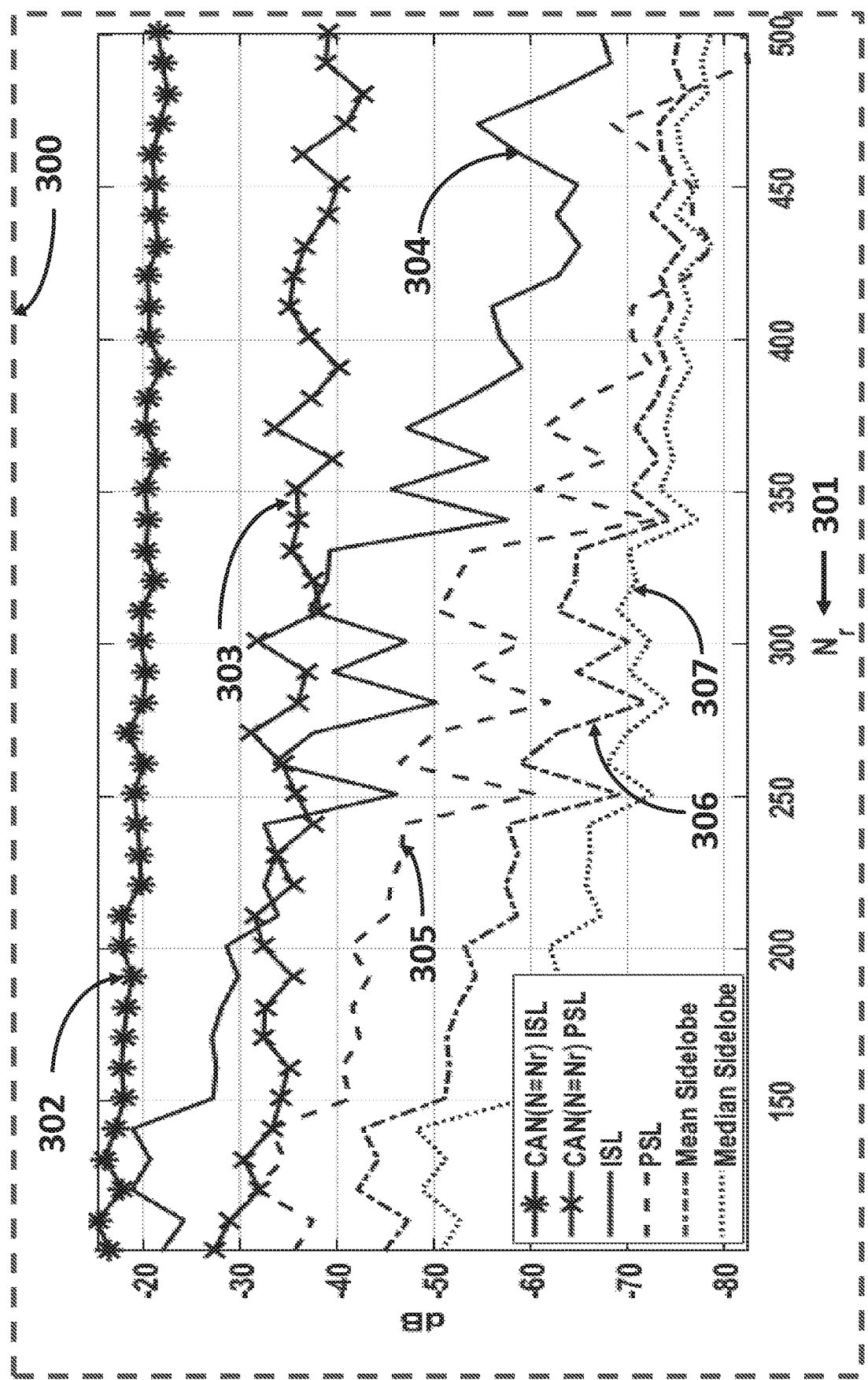
FIG. 3 is a plot comparing sidelobe level reduction for a MOW process compared to a Cyclic Algorithm New (CAN) algorithm.

Results for an embodiment are shown in FIG. 3, 300, for a unit modulus transmit code with $N_t=101$ samples and varying number receive samples $N_r$ on the axis 301 between 101 and 501, incrementing by 10. All range samples except for the mainlobe are counted as sidelobes. The basic constrained nonlinear minimization step 206 of flowchart 200 (shown in FIG. 2) minimizes the non-linear ISL penalty function (7), for the unknown vector in (11), with the non-linear equality constraint (9) and the inequality constraint (5) to keep the SNR loss less than 3 dB. The MATLAB® function fmincon is used with the interior point algorithm, a termination tolerance of $10^{-9}$ and a constraint tolerance of $10^{-10}$.

The CAN algorithm for minimizing ISL by a matched phase only code is run with the Golomb waveform as an initial condition. The CAN Matlab source codes were downloaded from http://www.sal.ufl.edu/book/. The convergence threshold $|x^{(n)}-x^{(n-1)}|$, where the superscript is the iteration number, was reduced from $10^{-5}$ to $10^{-9}$.

In FIG. 3, the solid line with asterisk markers 302 is the CAN ISL using for the number of code samples the corresponding number on the horizontal axis 301. The CAN ISL solid line with asterisks 302 decreases smoothly but not monotonically from −16.4 dB at 101 samples to a minimum of −21.9 dB for 491 samples. Mean sidelobe improvement is somewhat countered by an increase in the number of range samples summed. The MOW process improves performance. MOW ISL, represented with a solid line 304, decreases from −21.9 dB at 101 receive samples to −68.3 dB at 491 receive samples, in spite of having to sum over more range samples.

The CAN PSL, represented by a solid line with X markers 303, decreases from −27.2 dB at 101 samples to a minimum of −42.7 dB at 481 samples. MOW PSL, represented by a dashed line 305, decreases from −35.5 dB at 101 receive samples to −82.6 dB at 491 receive samples. PSL locations occur near the ends of the range extent.

Increasing the number of phase-only samples in the CAN algorithm improves performance, but for a large number of samples, it is 46.4 dB worse for ISL and 39.9 dB worse for PSL when compared to the MOW process. The MOW process results shown in FIG. 3 always have 101 transmit samples. As the transmit pulse width determines radar minimum range, improving the CAN algorithm by increasing the number of samples increases radar minimum detection range, but for the MOW process, the increase in receive waveform samples does not do this, as the transmit pulse width is constant.

Mean sidelobes of the MOW process are shown by a dash-dot line 306 and tracks ISL since the mean is calculated as ISL divided by one less than the number of range samples. It varies from 23 dB below ISL at 101 receive samples to 27.8 dB below ISL at 501 receive samples. Median sidelobes, shown by a dotted line 307 are lower still, reaching a minimum of −78.8 dB for 431 samples. Mean and median sidelobes are sometimes referred to as a sidelobe level for algorithms, such as NLFM chirps, that reduce sidelobes, but broaden the mainlobe.

Figure 4:
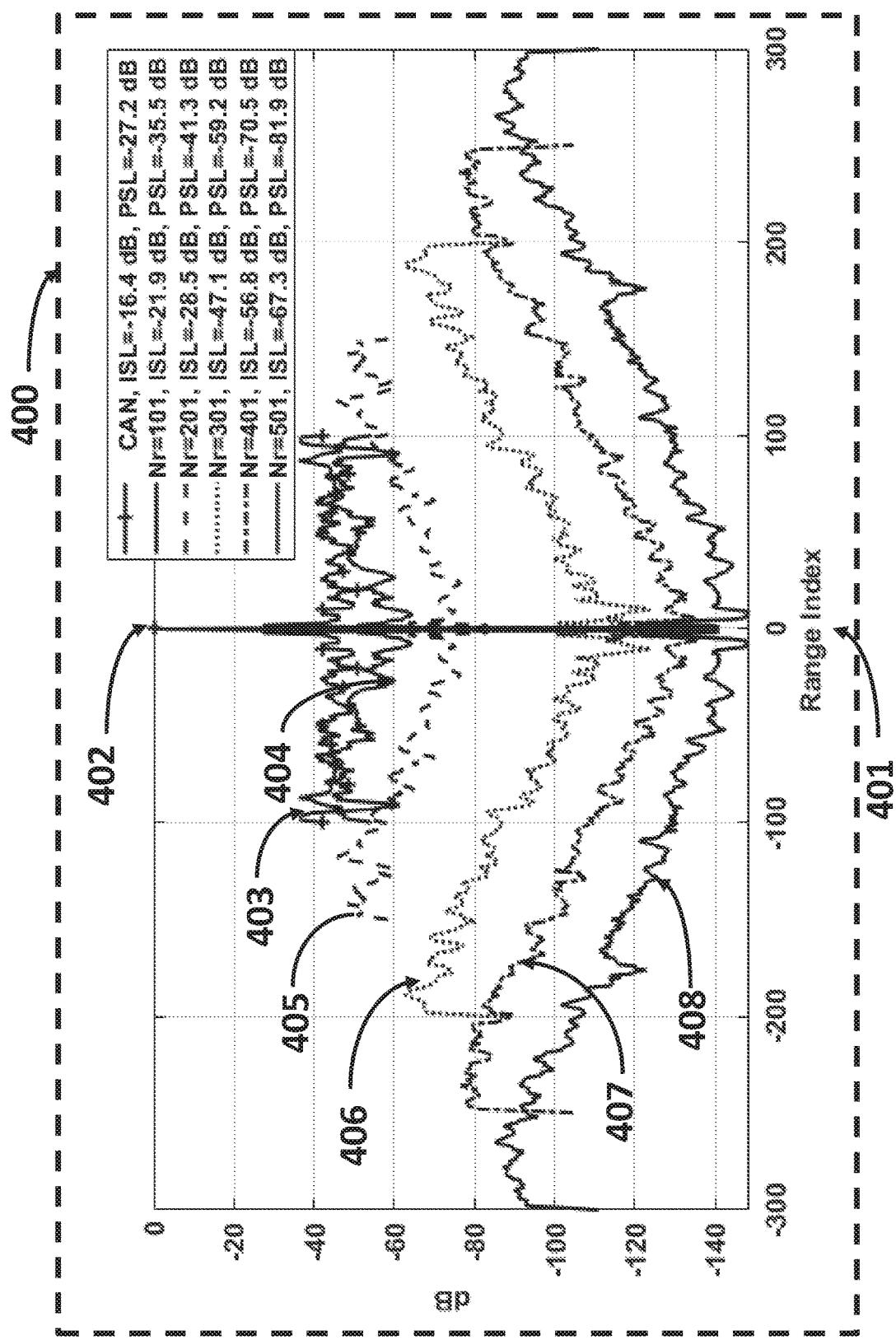
FIG. 4 is a plot of MOW range response for varying number of filter code samples compared with that from the CAN algorithm.

Selected range responses are in shown FIG. 4. Range index k from (3) is displayed on the horizontal axis 401. The number of transmit samples $N_t$ is always 101. The mainlobe 402 at k=0 is constrained to 0 dB. Range responses are smoothed by a 5-point equal-weight mean for readability. Responses within 3 samples of the mainlobe are not smoothed. ISL and PSL are evaluated from unsmoothed data. The CAN algorithm, represented by a solid line with cross markers 403, has an ISL of −16.4 dB and a PSL of −27.2 dB. Sidelobes away from the mainlobe are about −45 dB. The CAN range response has 201 samples. The number of receive samples for the MOW process starts at 101 and increases by 100 to 501. For $N_r=101$, the same number as transmit samples, shown by the solid line 404, the MOW process outperforms the CAN algorithm by 5.5 dB in ISL and by 8.3 dB in PSL. Range response for $N_r=201$ (line 405), 301 (line 406), 401 (line 407), and 501 (line 408) show steady decreases in ISL and PSL to spectacularly low values in the legend. Sidelobes nearest to the mainlobe are even lower. Higher clutter sidelobes away from the mainlobe may have less of a deleterious effect on a radar as they may be outside of the beamwidth, or have a very different radial velocity and are separated by Doppler processing. A unit-modulus auto-correlation range response must have its power endpoints equal to $1/N_t^2$ since for a single term, no cancellation is possible, which for 101 samples is −40.1 dB. This tracks with FIG. 4, line 403. MOW filter codes taper in amplitude near the endpoints. As a result, all MOW sidelobe endpoints are much lower.

Figure 5:
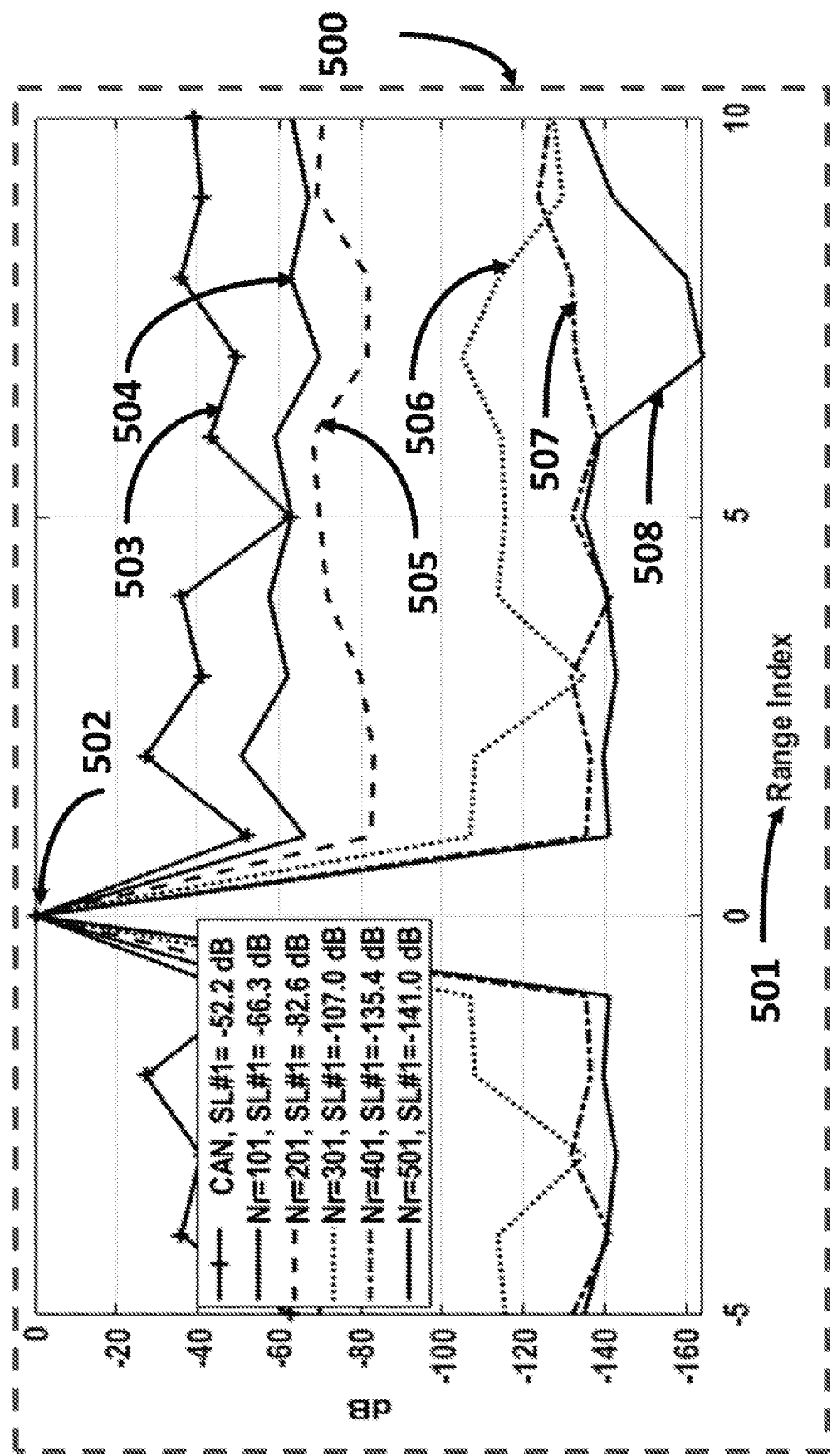
FIG. 5 is a magnified view of range responses from FIG. 4 near a mainlobe.

Multiple and continuously variable frequency chirps have lowered sidelobes but broadened mainlobes. Close in sidelobe level is extremely important for minimum detectable velocity (MDV), separating close targets, reducing clutter Doppler spread, and HRR radar. FIG. 5 shows the first 10 unsmoothed sidelobes of the range response plot 400 of FIG. 4. Range sidelobes are symmetric, so the legend covering the sidelobes left of the mainlobes is not suppressing any information. Again, the range index k in 501 has the value 0 at the mainlobe. Mainlobe level in 502 is still 0 dB. The CAN algorithm of 503 is the solid line with a cross marker 503 with a first sidelobe of −52.2 dB. MOW first sidelobe values are in the legend, for receive samples numbers of 101 (solid line 504), 201 (dashed line 505), 301 (dotted line 506), 401 (dash-dot line 507), and 501 (solid line 508). The decrease is down to an amazing −141.0 dB for 501 filter samples.

Figure 6:
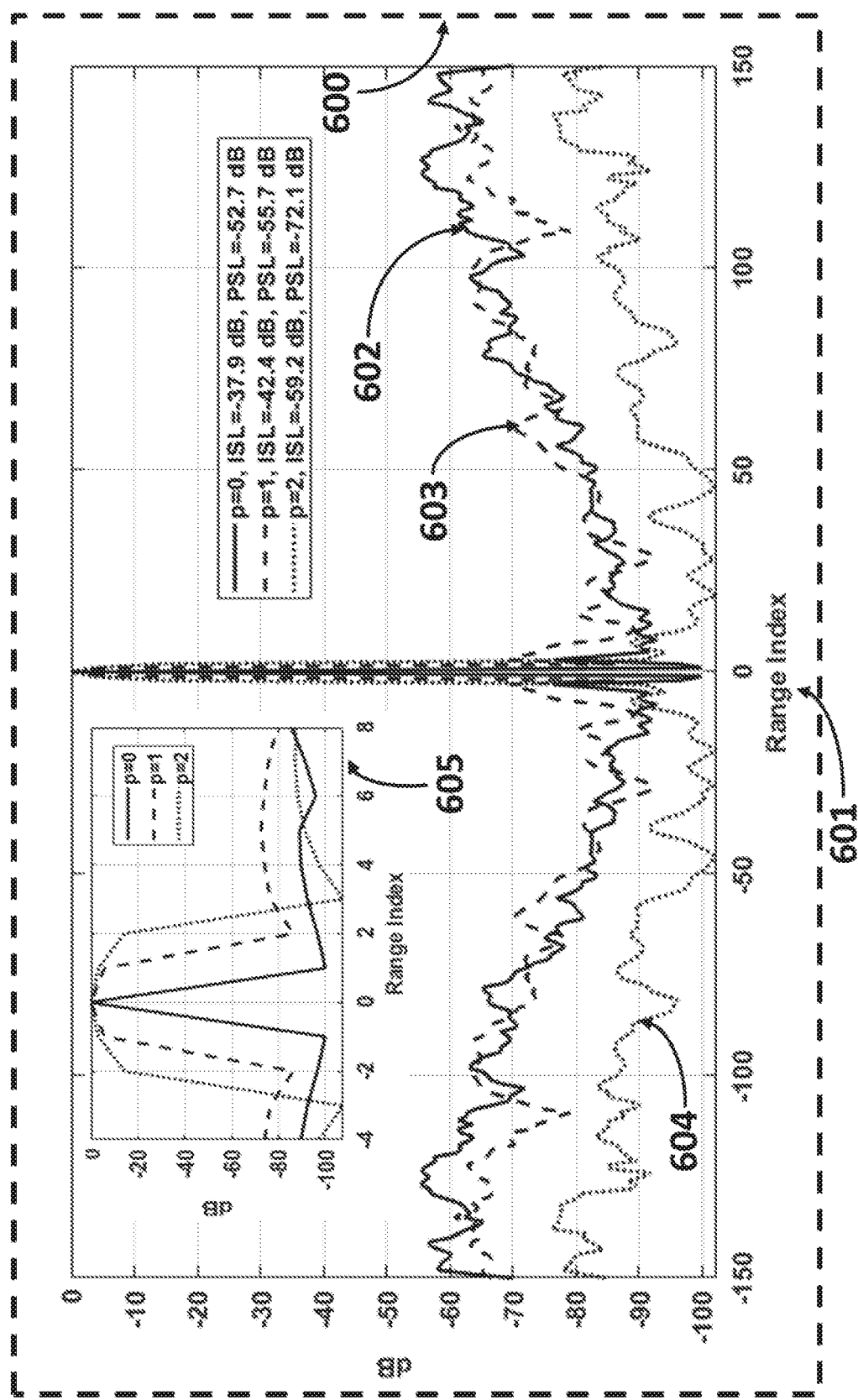
FIG. 6 is a plot of range responses upon excluding sidelobes adjacent to the mainlobe from the minimization function.

Excluding additional range samples increases performance as shown in FIG. 6. Range response is plotted against the range index 601. Excluding p=0, 1, and 2 samples on both sides of the mainlobe for $N_t$=101, $N_r$=201, results in ISL of −37.9 (solid line 602), −42.4 (dashed line 603), and −59.2 dB (dotted line 604), respectively. PSL is −52.7, −55.7, and −72.1 dB, respectively, where the region for the peak sidelobe excludes the enlarged mainlobe. The insert 605 shows range samples near the mainlobe. As p increases, the mainlobe broadens, but the first sidelobe level is lowest for the largest value of p. Although this is not shown, increasing weight coefficients for a subset of ranges results in much lower sidelobes in those regions. In some implementations, these weights can be asymmetric. Numerical experiments show that quantization losses at 12 bits are an acceptable few dB.

To maintain spectral containment to a target bandwidth, the MOW process can, in some implementations, use oversampled transmit and receive codes that are generated to minimize sidelobe power with constrained SNR loss and simultaneously minimize out of band spectral leakage. Usually, the inverse of the chip duration is equal to the frequency bandwidth. Here chips are oversampled by a factor L, implying $\tau_s$=1/(LB), where B is the bandwidth and $\tau_s$ is sample spacing. There are L samples per chip or inverse bandwidth. Therefore, the transmit code has $N_t$ samples or $N_t$/L chips and similarly for the filter code. Since the mainlobe is oversampled, an additional L−1 samples on both sides of the mainlobe are excluded from the minimization, as $$J_{SLO} = \left[\sum_{k=-N+1}^{-L} + \sum_{L}^{N-1}\right]|w(k)|r(k)|^2. \quad (12)$$

This oversampling implies that both codes should be bandlimited to [−0.5/L, 0.5/L] in units of cycles per sample, or equivalently, [−0.5, 0.5] in units of cycles per chip. Spectral leakage to frequencies outside of this target bandwidth should be suppressed. In practice, there is a transition region between the target bandwidth and the suppressed frequencies outside of the target bandwidth, and sidelobes are evaluated after the first notch from the mainlobe.

Band limiting is accomplished by adding weighted sums of penalty functions for frequency bands. A set of $N_B$ frequency bands in the transmit code to avoid is identified, where the $j^{th}$ band is between $f_{j1}$ and $f_{j2}$, with a corresponding weight $w_{jT}$, and the penalty function to minimize depends on the integrated spectral energy in the band of frequencies outside of the target bandwidth, as, $$\sum_{j=1}^{N_B} w_{jT} \int_{f_{j1}}^{f_{j2}} df |\hat{X}(f)|^2 = \quad (13)$$

-continued $$x^\dagger R^{TR} x = \sum_{m,n=1}^{N_t} R^{TR}(m,n) b(m) b(n) \exp[i(\phi(n) - \phi(m))]$$

$$R^{TR}(m,n) = \sum_{j=1}^{N_B} w_{jT} \begin{cases} \frac{\exp[2\pi i(m-n)f_{j2}\Delta t] - \exp[2\pi i(m-n)f_{j1}\Delta t]}{2\pi i(m-n)\Delta t}, & m \neq n \\ f_{j2} - f_{j1}, & m = n \end{cases},$$

$$\hat{X}(f) = \sum_{n=1}^{N_t} x(n) \exp[-2\pi i f(n-1)\Delta t],$$

Frequency and chip spacing $\Delta t$ have corresponding units.

The matrix $R^{TR}$ is Hermitian Toeplitz, so the scalar product $x^\dagger R^{TR} x$ can be computed in $O(N_t)$ operations. To better control relative penalty function magnitudes, a normalized form is used, $$J_{TR} = x^\dagger \overline{R}^{TR} x \quad (14)$$

$$\overline{R}^{TR}(m,n) = \frac{R^{TR}(m,n)}{R^{TR}(1,1)} + \lambda^{TR} \delta(m,n).$$

Diagonal loading by $\lambda^{TR}=10^{-4}$ is used as the frequency penalty matrix is otherwise singular. Another method sums over discrete FFT frequency bins, but significant zero-padding for additional intermediate bins is required, or spectral power spikes up between the chosen bins.

An equivalent penalty function for the receive filter code is calculated by $$J_{RV} = y^\dagger \overline{R}^{RV} y, \overline{R}^{RV}(m,n) = \frac{R^{RV}(m,n)}{R^{RV}(1,1)} + \lambda^{RV} \delta(m,n) \quad (15)$$

$$\sum_{j=1}^{N_B} w_{jR} \int_{f_{j1}}^{f_{j2}} df |\hat{Y}(f)|^2 = y^\dagger R^{RV} y,$$

$$\hat{Y}(f) = \sum_{n=1}^{N_r} y(n) \exp[-2\pi i f(n-1)\Delta t]$$

$$R^{RV}(m,n) = \sum_{j=1}^{N_B} w_{jR} \begin{cases} \frac{\exp[2\pi i(m-n)f_{j2}\Delta t] - \exp[2\pi i(m-n)f_{j1}\Delta t]}{2\pi i(m-n)\Delta t}, & m \neq n \\ f_{j2} - f_{j1}, & m = n \end{cases}.$$

In a preferred implementation, and without loss of generality, frequency band limits are the same as for the transmit code, as there is a different set of band weights. However, in some cases, the frequency band limits may be different for the transmit code and the filter code. The $R^{RV}$ matrix is also Hermitian complex.

The total objective function, sometimes referred to a penalty function, is $$J = \delta_{SL} J_{SLO} + \delta_{TR} J_{TR} + \delta_{RV} J_{RV}. \quad (16)$$

Spectral leakage is defined as the power in the avoided frequencies bands divided by power in the passband frequencies. Desired maximum leakage values are input (for example, as an input parameter 202 in the process represented by the flowchart 200). The minimization search of (16) is done in segments, with the output of one segment becoming the initial value of the following segment. The frequency penalty function weights are scaled at each segment by the ratio of the desired to actual leakage (for example, in step 209 of flowchart 200). Weighting for sidelobes is unchanged. Frequency penalty weight factors are not independent, since if there is little transmit out-of-band spectral power, there will be little from the filter code.

There is more flexibility with the asymmetric code. Additional frequency notches may be inserted asymmetrically within the bandwidth. For example, if a particular nearby frequency channel needs stronger suppression, transmit code weights in that band can be increased. Conversely, if there is a strong emitter into a nearby band, filter code band weights can be increased there.

Low-pass filtering necessary to contain transmit spectral power is incompatible with transmit waveforms ramping up at the first sample and ramping down at the last pulse sample. Therefore, in some implementations, the MOW process can ramp up and down the amplitude of the transmit code for a single chip duration using a Tukey taper, where a trigonometric interpolation is used from the ends extending over L samples, $$x(n) = b(n)\exp[i\phi(n)], n = 1, \ldots, N_t \quad (17)$$

$$b(n) = \begin{cases} \sin\left[\frac{(n-1)\pi}{2(L-1)}\right], n = 1, \ldots, L \\ 1, n = L+1, \ldots, N_t - L \\ \cos\left(\frac{(n-N_t+L-1)\pi}{2(L-1)}\right), n = N_t - L + 1, \ldots, N_t \end{cases}.$$

If available, the actual system ramping amplitude can be used instead. Except for this small fraction of amplitude ramping, the transmit waveform is otherwise unit modulus.

Figure 7A:
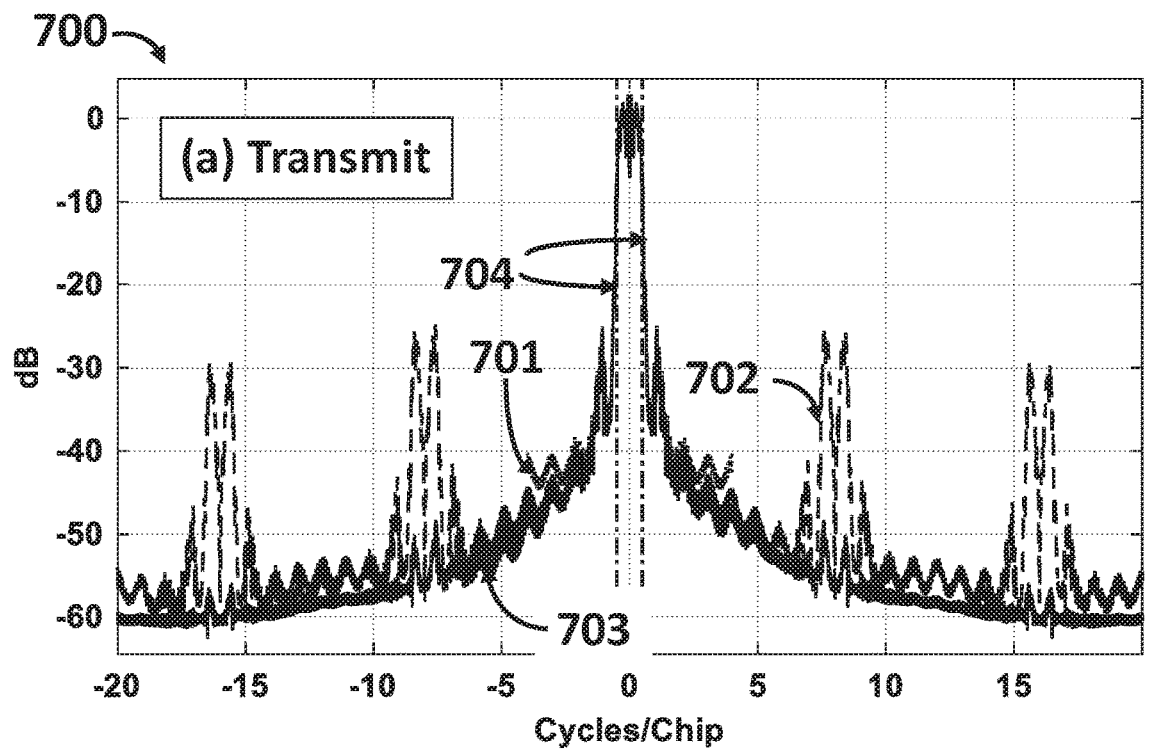
FIG. 7A is a plot of transmit waveform power spectral density for oversampling by L=8, zeroth and first order DACs, 201 transmit samples, and 601 filter samples.

Referring back to FIG. 1, once the generated transmit and filter codes are stored on the storage device 103 of the radar system 100, transmitter code output is then sent to the DAC 104. Referring to FIG. 7A, spectra are shown for 5 additional samples between each sample to model DAC time dependence. Therefore, there are 40 total samples in each chip, using an oversampling factor, L=8. Two DAC types are considered, a zero order hold, with constant value until the next sample, and a first order hold with a linear phase transition. Other parameters are $N_t$=201, $N_r$=601, symmetric codes, and desired frequency suppression of 20 dB. In the spectral plot FIG. 7A, frequency units are in cycles/chip. Power spectral density (PSD) of the 8× oversampling of chips 701 are shown, which extend between −4 and +4 cycles/chip. The DAC spectra for zeroth-order hold 702 and for a first-order hold 703 are also plotted. The vertical dashed-dot lines 704 are at −0.5 and 0.5 cycles/chip and bracket the bandwidth. Discontinuities at chip boundaries (in value for zero hold DAC and in first derivative for first order hold DAC) cause spectral peaks at near 8 cycles/chip and harmonics. Low spectral leakage levels and the small DAC peaks show that a first order hold DAC with 8× oversampled samples produces a time waveform without significant anomalies. Typically, CPM circuitry is not needed due to the spectral containment effectiveness of the system; however, in some arrangements, CPM functionality may be employed.

Referring again to FIG. 1, the analog band-pass filter 105 is applied before sending the signal to the amplifier 106 and the antenna 108. Since there is little out-of-band power, the bandpass filter transition frequencies can be placed well beyond the band limits 704, avoiding nonlinear phase response in this region. Frequency response of the filter is generally better in the center of the band, where most of the power is. Another advantage is that there is no straddling loss.

Figure 7B:
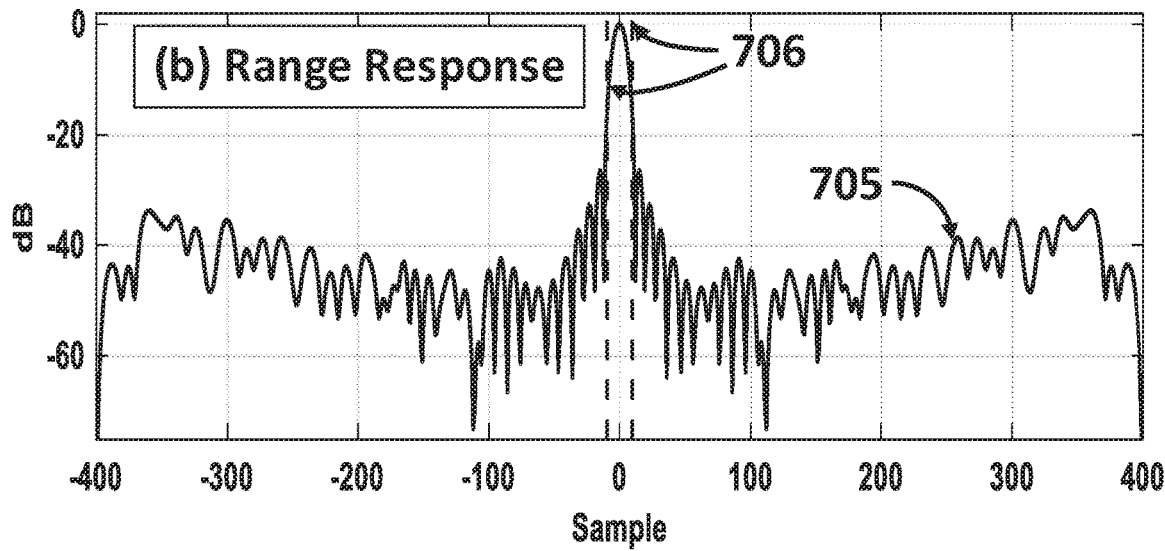
FIG. 7B is a plot of first order hold range response.

FIG. 7B shows the first order hold range response 705 of the transmit code from FIG. 7A, and has low sidelobe levels. Zeroth order hold range response is very similar and is not shown. Dashed lines 706 demarcate the expected mainlobe boundaries based on oversampling and filtering.

In some implementations, the MOW process can further account for Doppler tolerance. Chirp codes are fairly insensitive to Doppler shifts, but this is not true for a polyphase code. Performance of the codes calculated here decreases for small Doppler frequencies. For matched filters and widely separated targets, a FFT across multiple pulses yields a Doppler estimate, which is then used to correct received data. A bank of Doppler filters can be used and the one with lowest sidelobes is chosen. Generally, the goal here is to widen the Doppler frequency range where performance is good, defined as little loss in the mainlobe while maintaining acceptably low sidelobes. The continuous time ambiguity function is defined as $$\chi(\tau, f) = \int_{-\infty}^{\infty} dt x(t) y^*(t-\tau)\exp(2\pi i f t), \quad (18)$$

For discrete codes, (18) becomes $$\chi(k, f) = \begin{cases} \sum_{n=k+1}^{N_T} \bar{x}(n)\exp(2\pi i f n) y^*(n-k), k = 0, \ldots, N-1 \\ \sum_{n=1}^{N_T+k} \bar{x}(n)\exp(2\pi i f n) y^*(n-k), k = -N+1, \ldots, -1 \end{cases}, \quad (19)$$

where frequency f above has units of cycles/sample. The sidelobe minimization in (7) is extended to a set of Doppler frequencies, $$J_{SLD} = \sum_{m=1}^{M} \tilde{w}(f_m) \sum_{\substack{k=-N+1, \\ k \neq 0}}^{N-1} w(k)|\chi(k, f_m)|^2, \chi(0, 0) = 1. \quad (20)$$

In some implementations, a single equality constraint leads to fast execution times. In some implementations, the MOW process incorporates this Doppler tolerance into a joint optimization of both transmit and filter codes, while simultaneously addressing frequency suppression, and SNR Loss control.

Figure 8:
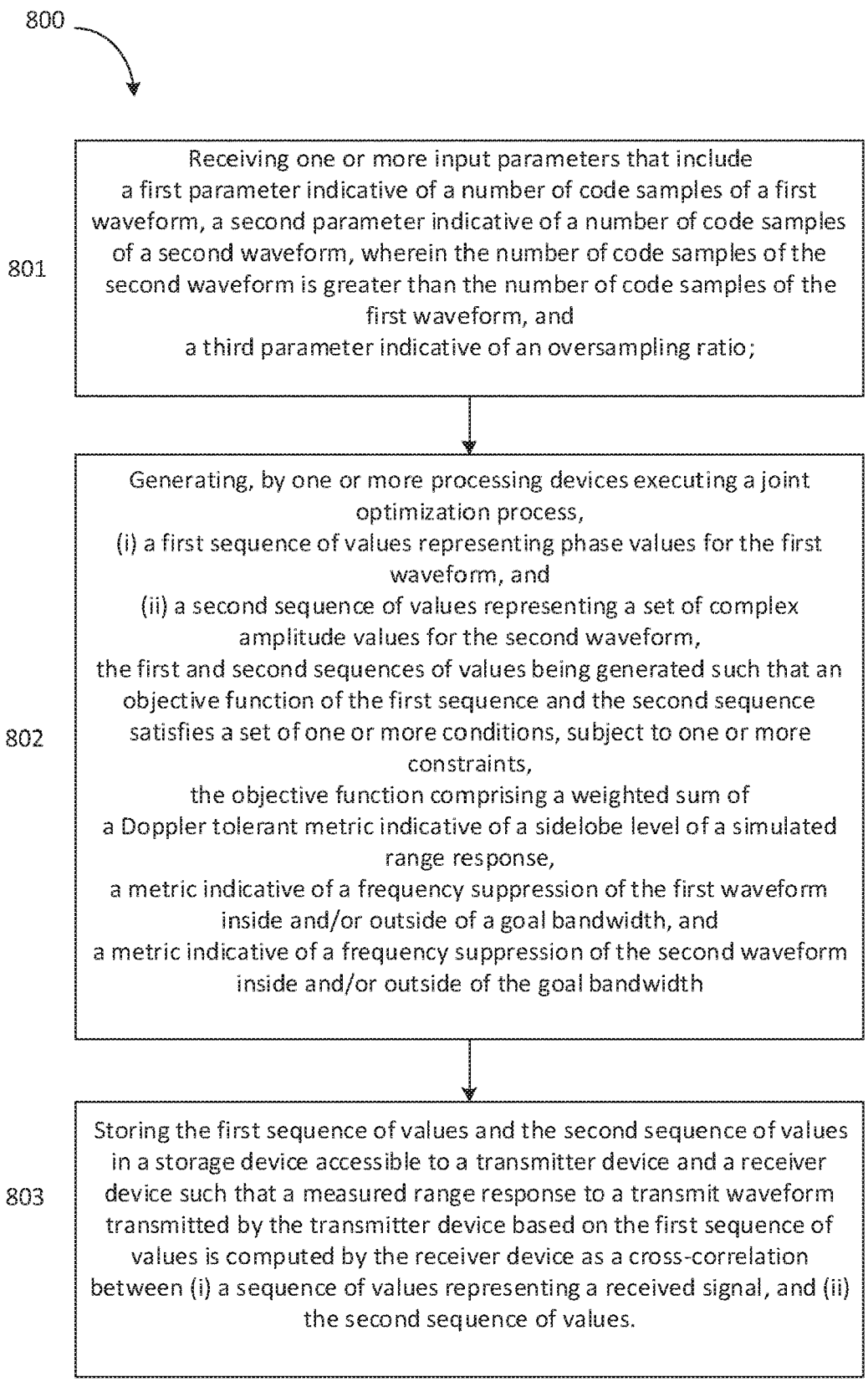
FIG. 8 is a flow chart of an example method for storing MOW transmit and filter codes in a storage device.

FIG. 8 is a flow chart of a computer device-implemented method 800 for storing MOW transmit and filter codes in a storage device (e.g., storage device 103). The method 800 can comprise a step 801 for receiving one or more input parameters that include a first parameter indicative of a number of code samples of a first waveform, a second parameter indicative of a number of code samples of a second waveform, wherein the number of code samples of the second waveform is greater than the number of code samples of the first waveform, and a third parameter indicative of an oversampling ratio. These input parameters can correspond to input parameters 202 and can further include parameters defining process variations described in reference to FIG. 2.

The method 800 can comprise another step 802 generating, by one or more processing devices executing a joint optimization process, (i) a first sequence of values representing phase values for the first waveform, and (ii) a second sequence of values representing a set of complex amplitude values for the second waveform, the first and second sequences of values being generated such that an objective function of the first sequence and the second sequence satisfies a set of one or more conditions, subject to one or more constraints, the objective function comprising a weighted sum of a Doppler tolerant metric indicative of a sidelobe level of a simulated range response, a metric indicative of a frequency suppression of the first waveform inside and/or outside of a target bandwidth, and a metric indicative of a frequency suppression of the second waveform inside and/or outside of the target bandwidth. In some cases, the target bandwidth can be considered a target bandwidth. In some cases, the joint optimization process of step 802 can be implemented as a constrained nonlinear minimization 206 as described in reference to FIG. 2. The first sequence of values representing phase values for the first waveform can correspond to a series of phases for a transmit waveform such as transmit code 117. The second sequence of values can correspond to a series of complex numbers for a filter waveform such as filter code 118. In some cases, the objective function can be a weighted sum of multiple non-linear scalar functions such as (16), and the set of one or more conditions can correspond to a local minimization. In some cases, the metric indicative of a sidelobe level of a simulated range response can correspond to $J_{SLD}$ (see (20)). In some cases, the metric indicative of a frequency suppression of the first waveform inside and/or outside of a target bandwidth can correspond to $J_{TR}$ (see (14)). In some cases, the metric indicative of a frequency suppression of the second waveform inside and/or outside of the target bandwidth can correspond to $J_{RV}$ (see (15)).

Method 800 can further comprise a step 803 for storing the first sequence of values and the second sequence of values in a storage device accessible to a transmitter device and a receiver device such that a measured range response to a transmit waveform transmitted by the transmitter device based on the first sequence of values is computed by the receiver device as a cross-correlation between (i) a sequence of values representing a received signal, and (ii) the second sequence of values. An example storage device may be storage device 103, accessible by a transmitter device (e.g. transmitting system 115) and receiver device (e.g. receiving system 116). In some cases, a correlator (e.g. correlator 112) of the receiver device (e.g. receiving system 116) can compute a measured range response as a cross-correlation between (i) a sequence of values representing a received signal (e.g. returns received via that antenna 108) and (ii) the second sequence of values (e.g. filter code 118).

A number of embodiments have been described. Nevertheless, it will be understood that various modifications can be made without departing from the spirit and scope of the processes and techniques described herein. In addition, the logic flows depicted in the figures do not necessarily require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device-implemented method comprising:
receiving one or more input parameters that include
a first parameter indicative of a number of code samples of a first waveform,
a second parameter indicative of a number of code samples of a second waveform, wherein the number of code samples of the second waveform is higher than the number of code samples of the first waveform, and
a third parameter indicative of an oversampling factor;
generating, by one or more processing devices executing a joint optimization process,
(i) a first sequence of values representing phase values for the first waveform, and
(ii) a second sequence of values representing a set of complex amplitude values for the second waveform,
the first and second sequences of values being generated such that an objective function of the first sequence and the second sequence satisfies a set of one or more conditions, subject to one or more constraints,
the objective function comprising a weighted sum of
a Doppler tolerant first metric indicative of a sidelobe level of a simulated range response,
a second metric indicative of a frequency suppression of the first waveform outside of a target bandwidth, and
a third metric indicative of a frequency suppression of the second waveform outside of the target bandwidth; and
storing the first sequence of values and the second sequence of values in a storage device accessible to a transmitter device and a receiver device such that a measured range response to a transmit waveform transmitted by the transmitter device based on the first sequence of values is computed by the receiver device as a cross-correlation between (i) a sequence of values representing a received signal, and (ii) the second sequence of values.

2. The method of claim 1, wherein the one or more input parameters are received based on a set of target characteristics comprising at least one of
a target value for the first metric indicative of the sidelobe level of the simulated range response,
a target value for a fourth metric indicative of an overall frequency suppression of the simulated range response, and
a target value for a fifth metric indicative of a Doppler tolerance.

3. The method of claim 1, wherein the metric indicative of the sidelobe level of the simulated range response comprises terms that represent at least one of an integrated sidelobe level, a peak sidelobe level, and a median sidelobe level with a range sample weighting.

4. The method of claim 1, wherein the one or more input parameters includes at least one of
a sample rate supported by the transmitter device and the receiver device, and
a target value for a metric indicative of an overall frequency suppression of the simulated range response.

5. The method of claim 1, wherein the one or more constraints comprises at least one of
a target SNR loss threshold;
a constraint imposed on a mainlobe associated with the simulated range response; and
a first phase of the first sequence of values constrained to 0.

6. The method of claim 1, wherein weights of the weighted sum are adjusted periodically after an input number of iterations until the objective function satisfies the set of one or more conditions.

7. The method of claim 1, wherein generating the first sequence of values and the second sequence of values comprises:
   initializing a first set of decision variables as a series of phases within a $2\pi$ range;
   initializing a second set of decision variables as a series of complex values; and
   generating the first and second sequence of values from the first and second set of decision variables, respectively, by executing the joint optimization process on the first and second set of decision variables, the joint optimization process being constrained by the one or more constraints.

8. The method of claim 1, wherein at least one sidelobe of the simulated range response is excluded from a computation of the objective function.

9. The method of claim 1, wherein generating the first and second sequence of values comprises:
   generating multiple candidate sets of values, each candidate set comprising a candidate first sequence of values and a candidate second sequence of values;
   computing, for each candidate set, a value of the objective function;
   determining that a value of the objective function for a particular candidate set is less than values of corresponding objective functions of other candidate sets; and
   responsive to determining that the value of the objective function computed for the particular candidate set is less than the values of corresponding objective functions of the other candidate sets, selecting the first and second candidate sequence of values corresponding to the particular candidate set as the first and second sequence of values, respectively.

10. The method of claim 1, wherein the one or more conditions comprises a condition that a value of the objective function is locally minimized.

11. The method of claim 1, wherein amplitudes of the transmit waveform are ramped up at a start of the transmit waveform and amplitudes of the transmit waveform are ramped down at an end of the transmit waveform.

12. The method of claim 1, wherein the Doppler tolerant metric indicative of a sidelobe level is a function of a time ambiguity function over a set of Doppler frequencies.

13. A radar system comprising:
   a transmitter device configured to transmit a transmit signal encoding a transmit waveform having a plurality of pulses, and
   a receiver device configured to receive a received signal, the transmitter device and the receiver device further configured to access a storage device configured to store a first sequence of values and a second sequence of values such that a measured range response to the transmit signal transmitted by the transmitter device based on the first sequence of values is computed by the receiver device as a cross-correlation between (i) a sequence of values representing the received signal, and (ii) the second sequence of values,
   the first sequence of values and the second sequence of values generated by a computing device configured to execute instructions to perform operations comprising:
      receiving one or more input parameters that include
         a first parameter indicative of a number of code samples of a first waveform,
         a second parameter indicative of a number of code samples of a second waveform, wherein the number of code samples of the second waveform is greater than the number of code samples of the first waveform, and
         a third parameter indicative of an oversampling factor; and
      generating, by one or more processing devices executing a joint optimization process,
         (i) the first sequence of values representing phase values for the first waveform, and
         (ii) the second sequence of values representing a set of complex amplitude values for the second waveform,
         the first and second sequences of values being generated such that an objective function of the first sequence and the second sequence satisfies a set of one or more conditions, subject to one or more constraints,
         the objective function comprising a weighted sum of
            a Doppler tolerant first metric indicative of a sidelobe level of a simulated range response,
            a second metric indicative of a frequency suppression of the first waveform outside of a target bandwidth, and
            a third metric indicative of a frequency suppression of the second waveform outside of the target bandwidth.

14. The radar system of claim 13, wherein the receiver device is further configured to generate an output indicative of a location of an object as calculated by multi-range processing around a peak range response.

15. The radar system of claim 13, wherein the one or more input parameters are received based on a set of target characteristics, the set of target characteristics comprising at least one of
   a target value for the metric indicative of the sidelobe level of the simulated range response,
   a target value for a metric indicative of an overall frequency suppression of the simulated range response, and
   a target value for a metric indicative of a Doppler tolerance.

16. The radar system of claim 13, wherein the metric indicative of the sidelobe level of the simulated range response comprises terms that represent at least one of an integrated sidelobe level, a peak sidelobe level, and a median sidelobe level.

17. The radar system of claim 13, wherein the one or more input parameters includes at least one of
   a sample rate supported by the transmitter device and the receiver device, and
   a target value for a metric indicative of an overall frequency suppression of the simulated range response.

18. The radar system of claim 13, wherein the one or more constraints comprises at least one of
   a target SNR loss threshold;
   a constraint imposed on a mainlobe associated with the simulated range response; and
   a first phase of the first sequence of values constrained to 0.

19. The radar system of claim 13, wherein weights of the weighted sum are adjusted periodically after an input number of iterations until the objective function satisfies the set of one or more conditions.

20. The radar system of claim 13, wherein generating the first sequence of values and the second sequence of values comprises:
   initializing a first set of decision variables as a series of phases within a $2\pi$ range;
   initializing a second set of decision variables as a series of complex values; and
   generating the first and second sequence of values from the first and second set of decision variables, respectively, by executing the joint optimization process on the first and second set of decision variables, the joint optimization process being constrained by the one or more constraints.

21. The radar system of claim 13, wherein at least one sidelobe of the simulated range response is excluded from a computation of the objective function.

22. The radar system of claim 13, wherein generating the first and second sequence of values comprises:
   generating multiple candidate sets of values, each candidate set comprising a candidate first sequence of values and a candidate second sequence of values;
   computing, for each candidate set, a value of the objective function;
   determining that a value of the objective function for a particular candidate set is less than values of corresponding objective functions of other candidate sets; and
   responsive to determining that the value of the objective function computed for the particular candidate set is less than the values of corresponding objective functions of the other candidate sets, selecting the first and second candidate sequence of values corresponding to the particular candidate set as the first and second sequence of values, respectively.

23. The radar system of claim 13, wherein the one or more conditions comprises a condition that a value of the objective function is locally minimized.

24. The radar system of claim 13, wherein amplitudes of the transmit waveform are ramped up at a start of the transmit waveform and amplitudes of the transmit waveform are ramped down at an end of the transmit waveform.

25. The radar system of claim 13, wherein the Doppler tolerant metric indicative of a sidelobe level is a function of a time ambiguity function over a set of Doppler frequencies.

26. One or more computer readable media storing instructions that are executable by a processing device, and upon such execution cause the processing device to perform operations comprising:
   receiving one or more input parameters that include
      a first parameter indicative of a number of code samples of a first waveform,
      a second parameter indicative of a number of code samples of a second waveform, wherein the number of code samples of the second waveform is greater than the number of code samples of the first waveform, and
      a third parameter indicative of an oversampling factor;
   generating, by one or more processing devices executing a joint optimization process,
      (i) a first sequence of values representing phase values for the first waveform, and
      (ii) a second sequence of values representing a set of complex amplitude values for the second waveform,
      the first and second sequences of values being generated such that an objective function of the first sequence and the second sequence satisfies a set of one or more conditions, subject to one or more constraints,
      the objective function comprising a weighted sum of
         a Doppler tolerant first metric indicative of a sidelobe level of a simulated range response,
         a second metric indicative of a frequency suppression of the first waveform outside of a target bandwidth, and
         a third metric indicative of a frequency suppression of the second waveform outside of the target bandwidth; and
   storing the first sequence of values and the second sequence of values in a storage device accessible to a transmitter device and a receiver device such that a measured range response to a transmit waveform transmitted by the transmitter device based on the first sequence of values is computed by the receiver device as a cross-correlation between (i) a sequence of values representing a received signal, and (ii) the second sequence of values.

* * * * *